E. A. VIVINUS.
PISTON OR LIKE PACKING.
APPLICATION FILED SEPT. 18, 1915.
1,216,521. Patented Feb. 20, 1917.
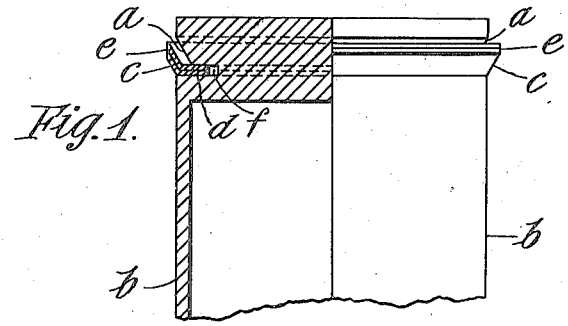
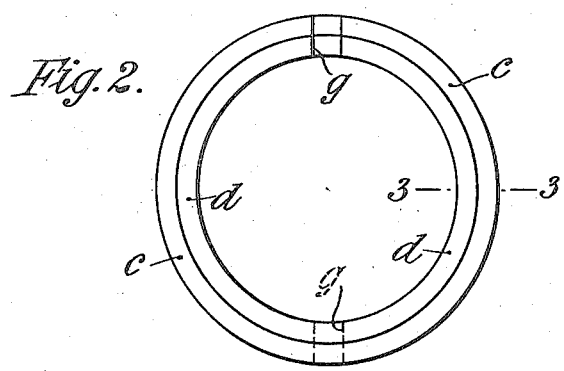
Inventor:
Edouard Alexis Vivinus
per
Barnard Burdon.
Attorney

UNITED STATES PATENT OFFICE.

EDOUARD ALEXIS VIVINUS, OF TONBRIDGE, ENGLAND.

PISTON OR LIKE PACKING.

1,216,521.  Specification of Letters Patent.  Patented Feb. 20, 1917.

Application filed September 18, 1915. Serial No. 51,493.

*To all whom it may concern:*

Be it known that I, EDOUARD ALEXIS VIVINUS, a subject of the King of Belgium, residing at 65 Quarry Hill, Tonbridge, in the county of Kent, England, engineer, have invented new and useful Improvements in Piston or Like Packing, of which the following is a specification.

This invention has reference to packing arrangements for pistons of engines, pumps or compressors and for other purposes.

The invention is applicable for instance to the pistons of internal combustion engines, petrol engines or the like, such as used for motor cars.

As ordinarily constructed, pistons are provided with circumferential grooves in which expansible or resilient packing rings (sometimes termed junk rings) are fitted. The ends of these rings are left free so that the ring can press outwardly against the wall of the cylinder with the object of forming a tight joint.

The effectiveness of the arrangement however depends on the force or spring of the metal itself forming the rings, or on the strength of auxiliary springs which are sometimes combined therewith. As however the spring pressure is distributed over a comparatively large area it is not always effective and three or more such rings, distributed along the body of the piston, are often employed to insure tightness. This requires the piston to be of a thickness which will safely accommodate the grooves for the rings, and consequently to be heavier than would otherwise be necessary.

Now according to this invention the action is improved by providing each ring with an inclined or beveled portion or flange. The said flange in effect forms a tapering ring or annulus, like a portion of a cone so situated that it does not extend beyond the end of the piston, but lies entirely between the two surfaces to be packed, the arrangement being such that when the pressure acts against the inclined surface it exerts an expanding or wedge-like action thereon, thus causing the edge of the inclined or conical flange to fit or bed itself closely against the surface on which it bears, independently of any spring pressure to which it may be subject.

In this way, the greater the pressure on the flanged ring or rings, the better will be the contact between the same and the adjacent surface.

When applied to the piston of an internal-combustion or explosion motor, the conically-flanged rings may in some cases be placed in an annular groove near the rear or top end of the piston, that is to say close to the ignition or compression chamber. Hence there is little or no risk of loss of pressure from the gases entering the space between the piston and the cylinder. Moreover the walls of the piston can be made comparatively thin, thus saving weight, since there is no need to have packing grooves at the middle thereof or distributed along the same.

Two or more such flanged rings, formed of copper or other suitable metal or material, or different metals or materials, may be used in the same groove, and may fit inside each other or one behind the other, so that they support one another, but do not appreciably impair the flexibility of the arrangement.

The edges of the flanges of the said rings thus lie one behind the other as it were, and any fluid which may happen to pass one will be intercepted by the next.

In order that the invention may be clearly understood and readily carried into effect reference will now be had to the accompanying drawings in which:—

Figure 1 shows one example of the improved packing arrangement half in vertical section and half in elevation.

Fig. 2 is a plan of the flanged packing rings.

Fig. 3 shows to a larger scale, a cross section through one of the rings on the line 3—3 of Fig. 2.

The packing rings referred to are fitted or sprung into the annular groove $a$ at the top end of the piston $b$.

Each of the rings is provided, as shown more clearly in Fig. 3, with a beveled or inclined flange $c$ extending say at an angle of about 60° from the flat portion or circular web $d$. The flanges $c$ may have their top rim tapered off as shown to form a vertical edge $e$ adapted to work against the inner wall of the cylinder. If not thus tapered, the said rim will however quickly acquire a flat edge of this kind.

In the example shown the two rings are placed one inside the other, and their flanges $c$, which may be approximately of the same width as the flat rings, both point upward toward the compression space of the engine. They are made of comparatively light metal, such as brass, and are sufficiently elastic or springy to enable them to be forced over the piston end so that they seat themselves in the packing groove $a$.

This latter has its lower side horizontal, its other side being sloped or inclined to correspond to the inclination of the flanges $c$. In the angle or junction of the two sides is a narrow throat or channel $f$ to receive the inner edges of the flat portions or webs $d$ of the packing rings.

The adjacent ends of the hoops or bands which compose the flanged rings may be left free or open, to form a transverse radial or inclined gap or slit $g$ of the ordinary kind to allow of expansion and contraction. The gap or opening in one ring is shown on the opposite side of the piston to that in the other ring, to prevent leakage in the usual way.

The rings need not necessarily be fastened together but if desired can be prevented from turning relatively to one another in any suitable way, for instance by means of notches or indentations and projections in their adjacent surfaces, which engage each other and prevent relative motion in a rotary sense.

Instead of the rings having their flanges pointing in the same direction they may be arranged to diverge or point in opposite directions, and one or more rings may be employed as may be found convenient.

Suitable holes or inclined passages may be formed in the piston, which may extend through the wall thereof on one or other side of the tapered or conical rings to prevent lubricant being drawn by suction into the ignition space, and to allow any oil which might otherwise be drawn into the said space, to drain through into the inside of the piston.

The invention may be applied to pistons for ordinary engines, pumps or compressors and to ordinary packing arrangements, such as stuffing boxes. In the case of a stuffing box for instance, the inclined, tapered or conical flanges may be arranged on the inside of the packing rings, so as to embrace tightly the rod or spindle or the like which works centrally in the stuffing box. Moreover in some cases, the inclined or conical rings may have distance pieces interposed between them, instead of pressing directly against each other. In other cases two or more sets of such rings may be arranged one behind the other at intervals if desired.

I claim:—

1. In a packing arrangement, the combination of a piston having a tapered recess around the closed end thereof, a groove extending inward from such tapered recess, flat rings fitting into said groove and free to expand and contract therein, and inclined flanges on said rings adapted when the rings are contracted to fit in the tapered recess, substantially as described.

2. In a packing arrangement the combination of flanged packing rings lying one inside the other, with their flanges splayed at an obtuse angle, a piston having a recess with one of its walls parallel with said flanges and a deep groove extending inward from the bottom of said recess to receive the flat portions of the packing rings and allow them to expand and contract freely, substantially as described.

3. In a metallic packing arrangement, the combination of a piston having a tapered recess and groove at one end thereof, flat rings fitting freely in said groove and flanges on said rings inclined to correspond to the taper of the recess, said rings and flanges being both free to expand and contract, and one ring breaking joint with the other, substantially as described.

In testimony whereof I have signed my name to this specification in the presence of two subscribing witnesses.

EDOUARD ALEXIS VIVINUS.

Witnesses:
   JOHN G. RAPHAEL,
   THOS. C. BROMLEY.